United States Patent
Wu et al.

(10) Patent No.: US 7,472,922 B2
(45) Date of Patent: Jan. 6, 2009

(54) ROCKER TRIM PACKAGED SIDE IMPACT AIRBAG SYSTEM

(75) Inventors: Fubang Wu, Rochester Hills, MI (US); Li Chai, Northville, MI (US); Nripen Saha, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 11/163,949

(22) Filed: Nov. 4, 2005

(65) Prior Publication Data

US 2007/0102906 A1    May 10, 2007

(51) Int. Cl.
*B60R 21/21* (2006.01)
*B60R 21/231* (2006.01)

(52) U.S. Cl. .................. 280/730.2; 280/743.2

(58) Field of Classification Search ............. 280/730.2, 280/743.1, 743.2; *B60R 21/21, 21/231*
See application file for complete search history.

(56) References Cited

U.S. PATENT DOCUMENTS

| | | | |
|---|---|---|---|
| 5,273,309 A * | 12/1993 | Lau et al. ................ 280/730.2 |
| 5,485,758 A | 1/1996 | Brown et al. | |
| 5,492,361 A * | 2/1996 | Kim ........................ 280/730.1 |
| 5,646,613 A * | 7/1997 | Cho .......................... 340/903 |
| 5,707,075 A * | 1/1998 | Kraft et al. .............. 280/730.2 |
| 5,730,464 A * | 3/1998 | Hill .......................... 280/743.2 |
| 5,746,443 A | 5/1998 | Townsend | |
| 5,911,434 A | 6/1999 | Townsend | |
| 5,957,487 A * | 9/1999 | Stutz ........................ 280/730.2 |
| 6,152,481 A * | 11/2000 | Webber et al. ........... 280/730.2 |
| 6,237,942 B1 * | 5/2001 | Swann ..................... 280/730.2 |
| 6,460,881 B1 | 10/2002 | Adomeit | |
| 6,508,487 B2 * | 1/2003 | Koster ..................... 280/730.2 |
| 6,517,110 B1 * | 2/2003 | Butters et al. .............. 280/749 |
| 6,648,368 B2 * | 11/2003 | Smith et al. .............. 280/730.2 |
| 6,664,470 B2 | 12/2003 | Nagamoto | |
| 7,338,072 B2 * | 3/2008 | Suekuni et al. ........... 280/730.2 |
| 7,350,852 B2 * | 4/2008 | Rust et al. ............... 296/187.06 |
| 7,374,201 B2 * | 5/2008 | Chausset ................. 280/728.3 |
| 7,390,017 B2 * | 6/2008 | Inoue et al. .............. 280/730.2 |
| 7,413,215 B2 * | 8/2008 | Weston et al. ........... 280/730.2 |
| 2005/0058322 A1 | 3/2005 | Farmer et al. | |

* cited by examiner

*Primary Examiner*—Faye M. Fleming
*Assistant Examiner*—Laura Freedman
(74) *Attorney, Agent, or Firm*—Frank A. MacKenzie; Brooks Kushman P.C.

(57) ABSTRACT

A side impact airbag system is disclosed that is stored behind cover panels provided on the A-hinge pillar, rocker, and C-body lock pillar. The airbag is stored in a receptacle until it is inflated by an inflator. The inflator inflates the airbag that is connected between fore-and-aft spaced anchoring points. When the airbag is in a deployed position, it is located between a seat and door of the vehicle. The deployment height of the airbag is controlled by tethering side shield panels that are secured between the airbag and the vehicle. The tethering side shield panels are not inflated by the inflator but are pulled to a taut condition as a result of the deployment of the airbag.

14 Claims, 2 Drawing Sheets

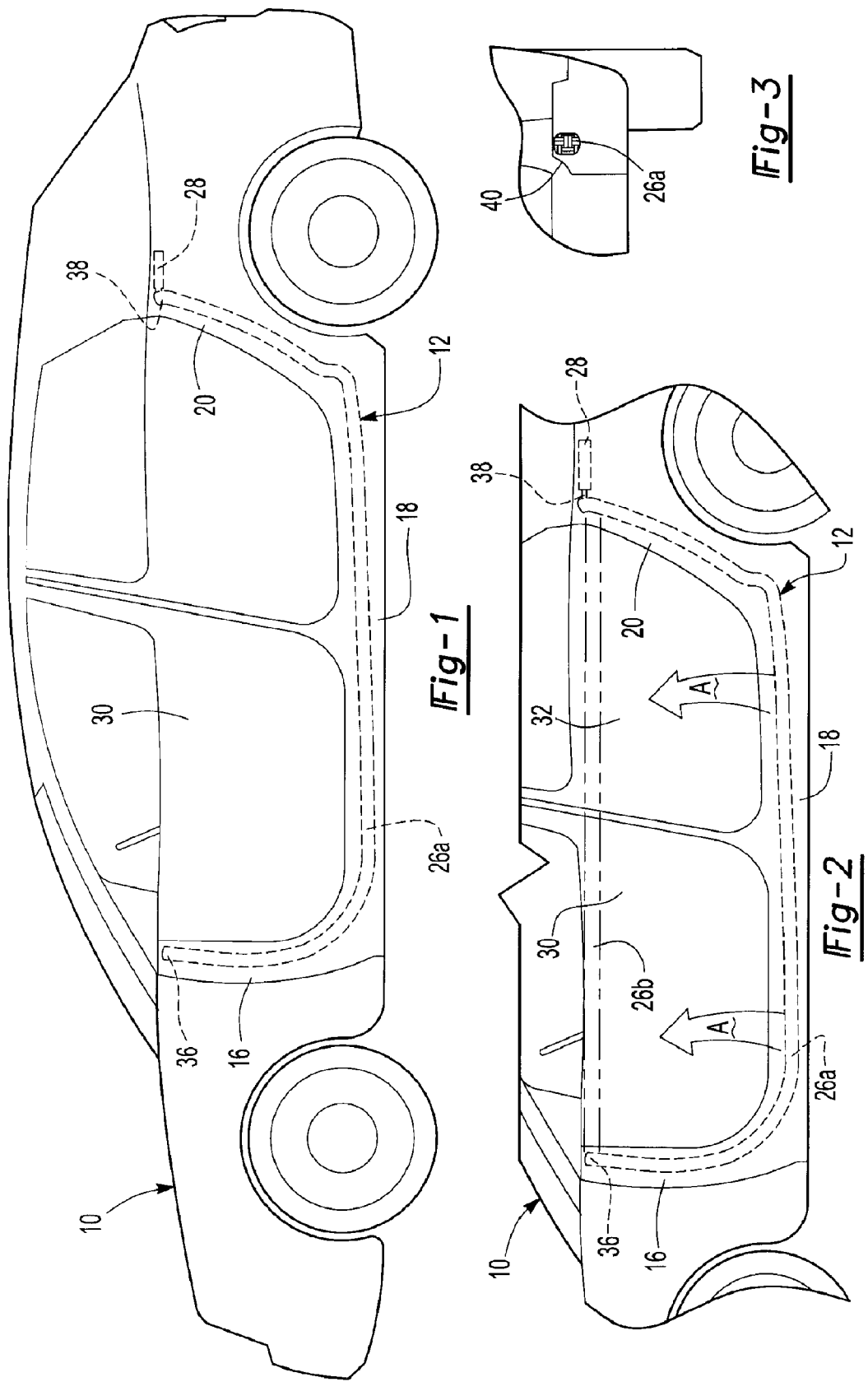

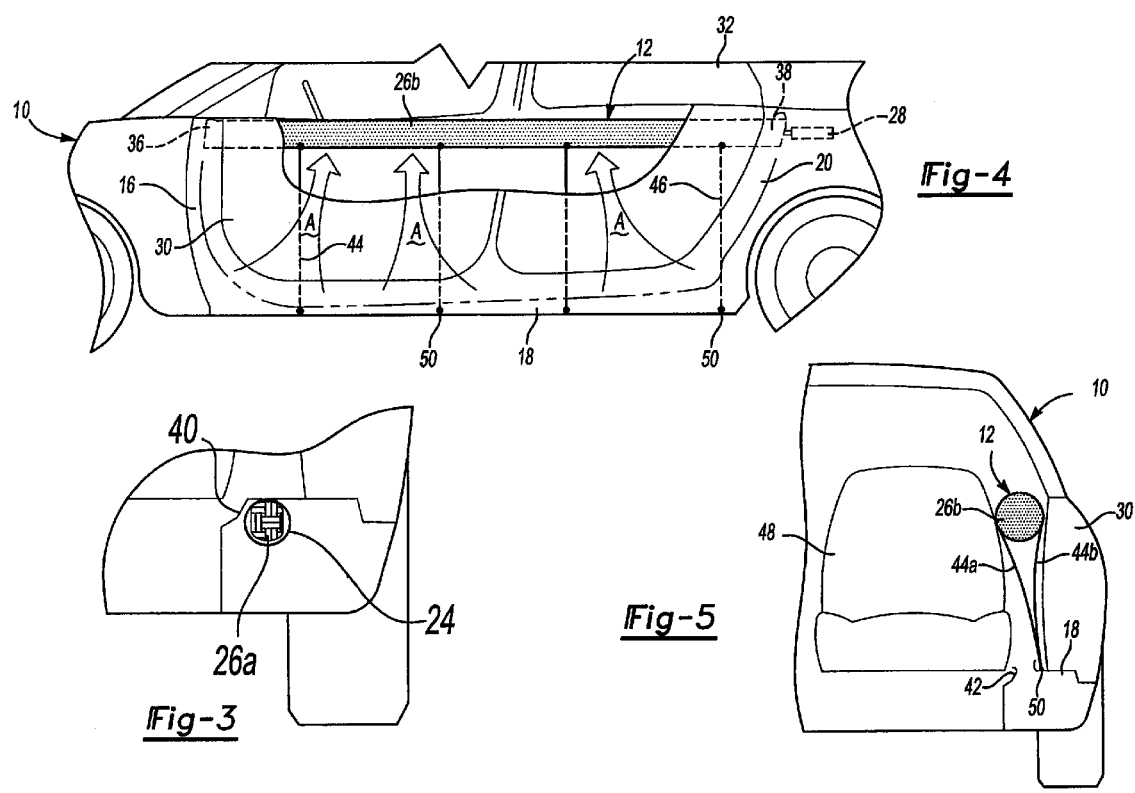

under inventory US 7,472,922 B2

ROCKER TRIM PACKAGED SIDE IMPACT AIRBAG SYSTEM

BACKGROUND OF THE INVENTION

1. Field of the Invention

The present invention relates to side impact airbag systems.

2. Background Art

Side impact airbag systems have been developed to protect vehicle occupants in the event of a side impact.

Seat mounted side impact airbags are widely used to protect the upper and lower body of a vehicle occupant during a side impact incident. Seat mounted side impact airbags may not properly deploy into the gap between the occupant and door trim if the gap between the door and the occupant is closing too fast during an impact.

Door mounted side impact airbags have also been developed to protect vehicle occupants in a single row of a vehicle. Separate airbags must be provided for each door to protect occupants in multiple rows. Additional costs are incurred to provide separate airbags for occupants in each row of a vehicle.

The present invention is directed to solving the above problems as summarized below.

SUMMARY OF THE INVENTION

According to one aspect of the present invention a side impact airbag assembly is provided that is packaged inside the hinge pillar, C pillar and rocker trim panels. The proposed side impact airbag assembly deploys in an upward direction during a side impact incident. The upward deployment is realized by applying a tensioning force between anchoring points located at the belt line of the vehicle.

The upper cross section of the side impact airbag is enlarged when the airbag is deployed. As the side impact airbag is deployed it is pushed into the gap between the occupant and the door trim.

The side impact airbag has an enlarged upper cross section that generates sufficient cushioning to provide protection during a side impact incident. The proposed side impact airbag deploys without regard to the speed at which the gap is closing during a side impact incident.

The purposed side impact airbag system can be configured in two ways. In the first design two side shield panels provide a path for the side impact airbag to travel during deployment. The side shield panels provide additional cushioning for occupant protection. Alternatively, two side shield panels may be integrated to form the side impact airbag with a single or multiple chambers.

According to another aspect of the present invention, a side impact airbag system for a vehicle having a rocker, a front hinge pillar, and a rear body lock pillar is provided. The airbag comprises an elongated airbag defined by a tubular textile member. The side impact airbag is deployed at the belt line of the vehicle. An inflator is provided that selectively emits a gaseous medium into the airbag to inflate the airbag in the event of a collision. The airbag is stored in a compartment in the rocker, the front hinge pillar and the rear body lock pillar. The airbag is deployed by being filled with the gaseous medium as it moves to a position adjacent the belt line of the vehicle.

According to another aspect of the present invention a side impact airbag system and vehicle are provided in combination. The vehicle has a door, a seat, a rocker, a front hinge pillar and a rear body lock pillar. The airbag is formed as a tubular textile member. An inflator selectively emits a gaseous medium into the airbag to inflate the airbag in the event of a side impact collision. The airbag is stored in a compartment in the rocker, the front hinge pillar and the rear body lock pillar. The airbag is inflated by the gaseous medium and moves to a position between the door and seat of the vehicle.

According to another aspect of the present invention an airbag system for a vehicle having a receptacle that extends across the portion of the vehicle spanned by the front door and rear door. The receptacle has a trim plate in which an airbag may be stored. The airbag comprises an elongated hollow member that has a stored position in the receptacle and deployed position in which the airbag extends between spaced connection points in the passenger compartment. The connection points are vertically spaced from the receptacle. The airbag system also includes an inflator that is operatively assembled to the airbag to selectively provide a gaseous medium that flows into the airbag when triggered by a collision.

According to other aspects of the invention, the cover panels may be disposed over the compartment and are opened by the force of the airbag as the gaseous medium inflates the airbag. The elongated airbag is gathered into a compressed condition when it is stored in the compartment.

According to other aspects of the invention, the airbag moves to a position at the level of a shoulder of an occupant of a vehicle seat. At least one tethering side shield panel may be provided to connect the airbag to the compartment and thereby limits the upward movement of the airbag. The tethering side shield may be a web of textile material that is drawn to a taut condition as the airbag is moved toward the belt line of the vehicle to provide a buffer below the airbag that is not inflated by the inflator.

These and other aspects of the invention will be better understood in view of the attached drawings and the following detailed description of the illustrated embodiment.

BRIEF DESCRIPTION OF THE DRAWINGS

FIG. 1 is a side elevation view of a vehicle having a side impact airbag system made in accordance with the present invention;

FIG. 2 is a fragmentary side elevation view showing the side impact airbag system of the present invention in its stored and deployed positions;

FIG. 3 is a fragmentary diagrammatic view showing the side impact airbag of the present invention stored in the rocker panel area of the vehicle;

FIG. 4 is a fragmentary side elevation view showing the side impact airbag system of the present invention in its deployed position; and FIG. 5 is a fragmentary diagrammatic front elevation view showing the side impact airbag system of the present invention in its deployed position.

DETAILED DESCRIPTION OF THE PREFERRED EMBODIMENT(S)

Referring to FIG. 1 a vehicle 10 is shown that is equipped with a side impact airbag system 12 made according to one embodiment of the present invention. The vehicle 10 has an A-hinge pillar 16, a rocker 18 and a C-body lock pillar 20 in which airbag 26 is disposed when stored.

Referring to FIG. 2, the vehicle 10 is partially illustrated to show the two positions of the airbag. The airbag when stored in a receptacle 24 is referred to by reference numeral 26*a*. The airbag when deployed is referred to by reference numeral 26*b*. The airbag 26 is deployed by actuating an inflator 28 that supplies a gaseous medium to the airbag causing it move from the position of the airbag 26a as it is stored in the receptacle 24 to the position of the airbag 26b when it is deployed. The airbag 26b when deployed extends fore-and-aft across the front door 30 and rear door 32 of the vehicle 10. The airbag 26 is secured to the vehicle 10 at a front anchoring point 36 and rear anchoring point 38.

Referring to FIG. 3, the airbag 26a in its stored position in the receptacle is shown in the rocker 18 area of the vehicle 10. The airbag 26a when stored in the receptacle 24 is enclosed by a cover panel 40. It should be understood that more than one cover panel may be required to cover the entire length of the airbag 26a.

Referring to FIG. 4, the vehicle is partially illustrated to show the airbag 26b in its deployed position. Arrows A are provided to indicate the path of movement of the airbag 26 as it moves from the stored airbag condition 26a in the receptacle 24 to the deployed airbag position 26b.

Referring to FIGS. 4 and 5, the deployed airbag 26b is shown after it has been deployed with the open cover panel being indicated by reference numeral 42. The deployed airbag 26b is shown secured to the vehicle near the receptacle 24 in the rocker 18. A front seat tethering side shield panel 44 and a rear seat tethering side shield panel 46 are provided adjacent the front door 30 and rear door 32, respectively. The tethering side shield panels 44, 46 limit the upper movement of the airbag 26b so that it is positioned at the proper height to protect the shoulder of a vehicle occupant.

Referring to FIG. 5, the tethering side shield panels 44, 46 may be constructed of two flexible fabric panels 44a and 44b, respectively, that form a V below the deployed airbag 26b. While not shown, two fabric panels are also provided in a similar manner for the rear tethering side shield panels 46. The flexible fabric panels are gathered together with the stored airbag 26a in the receptacle 24. The flexible fabric panels 44a and 44b are connected to an anchor point 50 adjacent the receptacle 24 and extend to an inboard location and an outboard location on the deployed airbag 26b. The airbag 26b when deployed is positioned between the vehicle seat 48 and the front door 30 of the vehicle 10.

While the best mode for carrying out the invention has been described in detail, those familiar with the art to which this invention relates will recognize various alternative designs and embodiments for practicing the invention as defined by the following claims.

What is claimed is:

1. A side impact airbag system for a vehicle having a rocker panel area, a front hinge pillar, a rear body lock pillar, and a beltline, the air bag system comprising:
   an elongated airbag defined by a tubular textile member;
   an inflator that selectively emits a gaseous medium into the airbag to inflate the airbag in the event of a collision;
   the airbag being stored in a compartment in the rocker panel area, the front hinge pillar, and the rear body lock pillar;
   at least one tether connecting the airbag to the compartment that limits the upward movement of the airbag, wherein the tether is at least one web of textile material that is drawn to a taut condition as the airbag is moved toward the beltline of the vehicle to provide a buffer below the airbag that is not inflated by the inflator; and
   wherein the airbag is deployed by being filled with the gaseous medium and moving in an upward direction to a position adjacent the beltline of the vehicle.

2. The side impact airbag system of claim 1 further comprising cover panels disposed over the compartment that are opened by the force of the airbag as the gaseous medium inflates the airbag.

3. The side impact airbag system of claim 1 wherein the elongated airbag is gathered into a compressed tubular state when stored in the compartment.

4. The side impact airbag system of claim 1 wherein the airbag moves to a position at the level of a shoulder of an occupant of a vehicle seat.

5. A side impact airbag system and a vehicle in combination, comprising:
   the vehicle having a door, a seat, a rocker, a front hinge pillar, and a rear body lock pillar,
   an air bag being formed as a tubular textile member that is contained in a receptacle;
   an inflator that selectively emits a gaseous medium into the airbag to inflate the airbag in the event of a collision;
   at least one tether connecting the airbag to the receptacle that limits the upward movement of the airbag, wherein the tether is a web textile material that is drawn to a taut condition as the airbag is moved toward the beltline of the vehicle to provide a buffer below the airbag that is not inflated by the inflator;
   the airbag being stored in the receptacle in the rocker, the front hinge pillar, and the rear body lock pillar; and
   wherein the airbag is inflated by the gaseous medium and moves to a position between the door and the seat of the vehicle.

6. The side impact airbag system of claim 5 further comprising cover panels disposed over the receptacle that are opened by the force of the airbag as the gaseous medium inflates the airbag.

7. The side impact airbag system of claim 5 wherein the elongated airbag is gathered into a compressed state when stored in the receptacle.

8. The side impact airbag system of claim 5 wherein the airbag moves to a position at the level of a shoulder of an occupant of a vehicle seat.

9. An airbag system for a vehicle having a passenger compartment, the passenger compartment having a receptacle that extends across the front door and rear door of the vehicle, the receptacle having a trim plate, the air bag system comprising:
   an elongated airbag that has a stored position in the receptacle and a deployed position in which the airbag extends between fore-and-aft spaced connection points in the passenger compartment that are vertically spaced from the receptacle;
   an inflator is operatively assembled to the airbag to selectively provide a gaseous medium that flows into the airbag when triggered by a collision; and
   at least one tethering side shield panel connecting the airbag to the receptacle that limits the upward movement of the airbag, wherein the tethering side shield is a web of textile material that is drawn to a taut condition as the airbag is moved toward the deployed position to provide a buffer below the airbag that is not inflated by the inflator.

10. The airbag system of claim 9 wherein the airbag when deployed is positioned between a door of the vehicle and a seat that is located adjacent the door.

11. The airbag system of claim 9 wherein the receptacle is covered by the trim plate when the airbag is in the stored position.

12. The airbag system of claim 11 wherein the trim plate breaks away from the receptacle to permit the airbag to move from the stored position to the deployed position.

13. The airbag system of claim 9 wherein the airbag is gathered into a compressed condition when stored in the receptacle.

14. The airbag system of claim 9 wherein the airbag moves to a position at the level of a shoulder of an occupant of a vehicle seat.

\* \* \* \* \*